Sept. 3, 1935.  C. L. KENNEY  2,013,444
LAUTERING APPARATUS FOR BREWING
Filed July 23, 1934  3 Sheets-Sheet 3
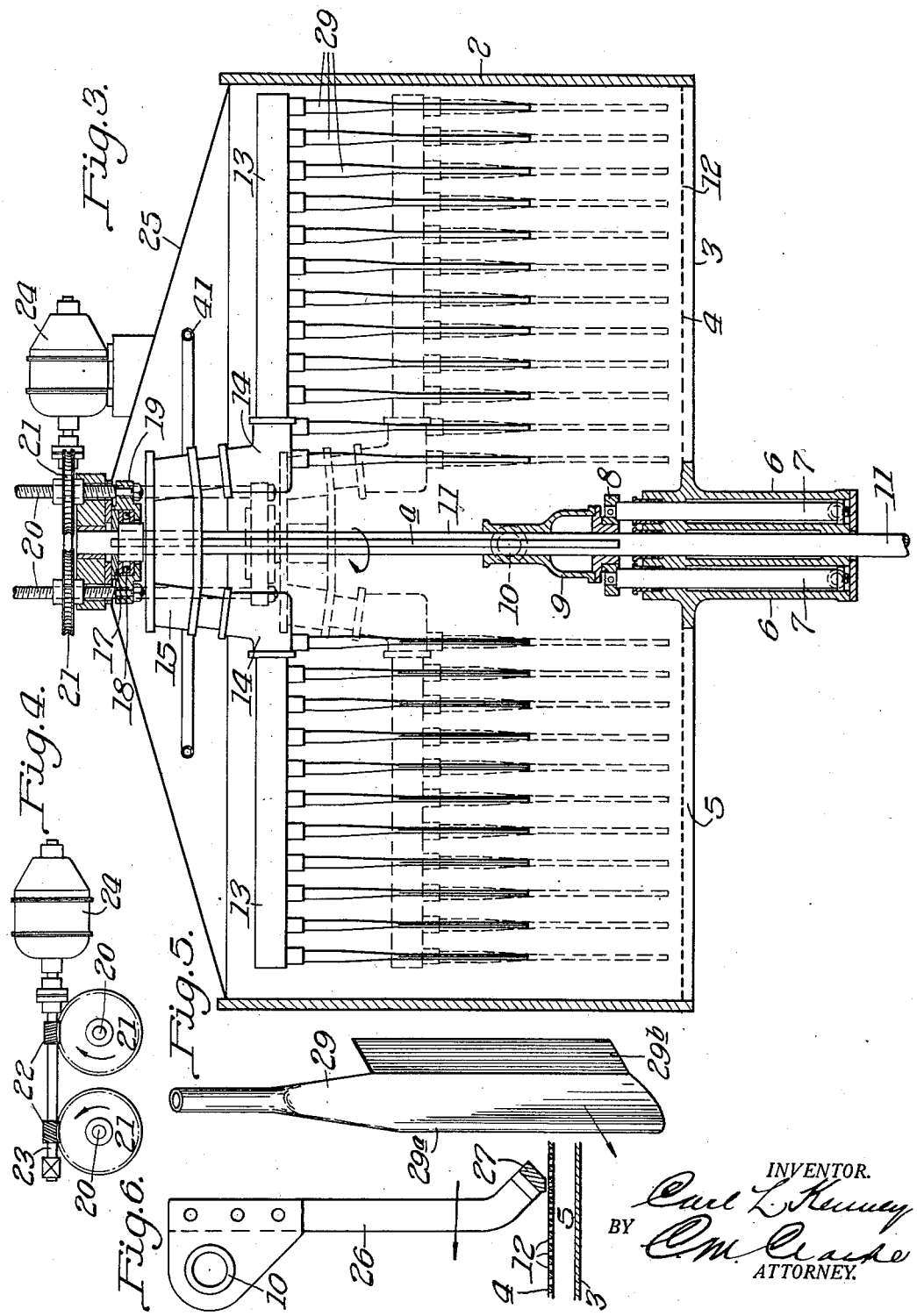
INVENTOR.
Carl L. Kenney
BY
ATTORNEY.

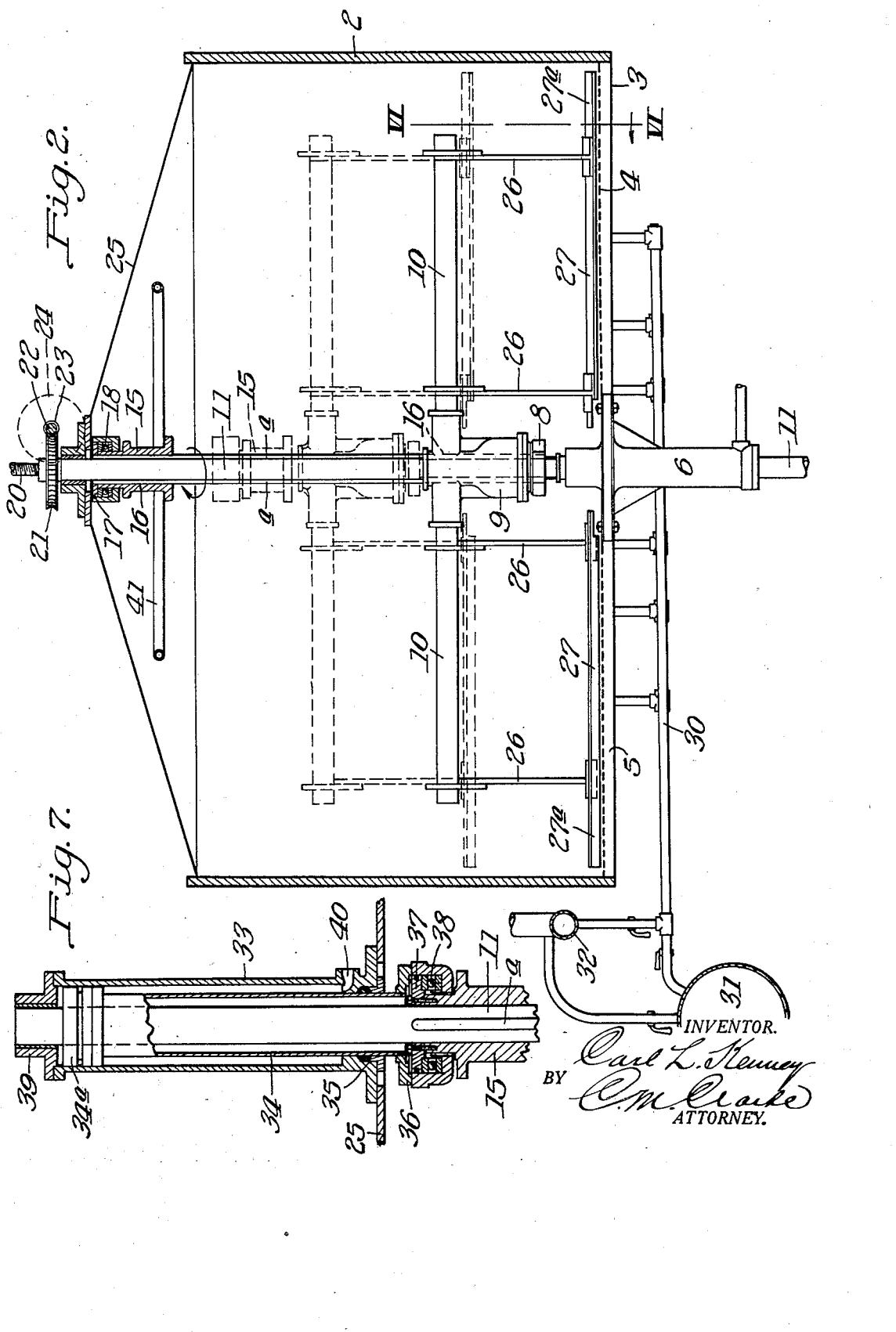

Patented Sept. 3, 1935

2,013,444

UNITED STATES PATENT OFFICE 2,013,444

LAUTERING APPARATUS FOR BREWING

Carl L. Kenney, Pittsburgh, Pa.

Application July 23, 1934, Serial No. 736,455

6 Claims. (Cl. 259—107)

This invention consists of an improvement in the art of brewing beer and the like, and comprises an improved lautering tub and its accompanying mechanism, as hereinafter more fully described.

Following the usual practice, the several initial preparations and treatments of the mash are performed in a separate circular tub, and the mash is then transferred to the lautering tub of the present application.

In their entirety the several main brewing operations follow the essential main steps of established practice, in mashing, lautering, sparging and grain removal. Without describing these in detail, the mashing operation consists in cooking the meal in water at a proper temperature for combining two cereals, as malt and corn or malt and rice. The malt combines with the starches to form sugar and the process is continued until all sugar is in solution.

Lautering consists in disturbing or loosening the mash and drawing off the liquid extracts resulting from the mashing process, leaving behind the spent grains. In sparging, water is added to the mash, followed by further lautering to remove additional liquid extracts, with final removal of the spent grains by scraping them into the grain outlets.

In the present invention, I have provided in the lautering tub, a combination mash stirring and lauter device including an individually controlled aufhack, and an individually controlled scraper. Each is capable of individual elevation and lowering, and of simultaneous rotation.

The operation in its successive steps, provides:

(a) Lowering of the aufhack into the mash and its rotation with the scraper elevated;

(b) Lautering by annular rotation of the aufhack blades;

(c) Sparging;

(d) Elevation of the aufhack and lowering of the scraper for removing spent grains to outlets.

The invention involves separate lautering devices comprising an individually controlled aufhack and a co-operating scraper in a brewing tub, thus provided with a plurality of operating members, each individually raised and lowered. Each is thus adjusted and rotated in either operative or inoperative position by actuating means provided, and the construction and operation will be understood from the following description.

The invention is illustrated in the accompanying drawings, in which:

Fig. 2 is a transverse sectional view on the line II—II of Fig. 1, showing the scraper lowered, and indicating its raised position in dotted lines;

Fig. 3 is a transverse section on the line III—III of Fig. 1, showing the aufhack raised, and indicating its lowered position in dotted lines;

Fig. 4 is a plan view showing the raising and lowering gearing for the aufhack supports;

Fig. 5 is a perspective detail view of one of the aufhack blades;

Fig. 6 is a sectional detail view of the scraper blade, on the line VI—VI of Fig. 2;

Fig. 7 is a sectional view showing a modified construction of overhead hydraulic lift for the aufhack.

Figure 1:
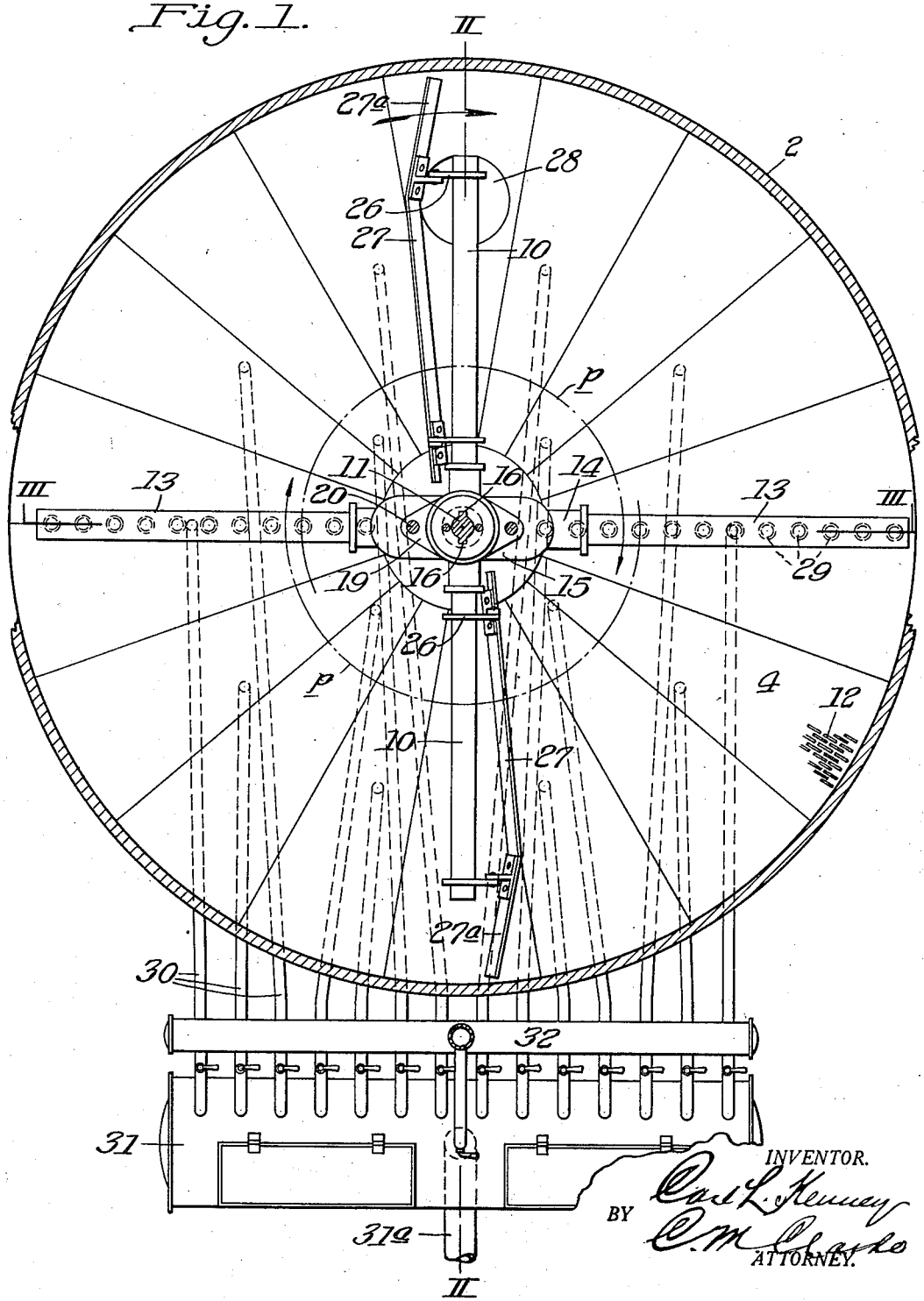
Fig. 1 is a plan view of the mash tub and the aufhack and scraper arms in their relative positions.

Referring to the drawings, the mash tub 2 is of usual cylindrical construction having a closed plate metal bottom 3 and an inner false bottom 4, perforated for seepage of liquid to the intervening space 5. The permanent bottom 3 is provided with a valved grains outlet 28, and the false bottom 4 is preferably made in sections of bronze plates, slotted as at 12, one section having an opening giving access to the grains outlet, not necessarily herein described.

Midway of the mash tub and rigidly incorporated with the bottom 3 is a pair of hydraulic cylinders 6. In each of said cylinders is mounted the plunger 7 extending up through a stuffing box connected with cross-head 8 carrying the swivelled head 9 supporting the scraper-carrying arms 10. A central shaft 11 extends upwardly between cylinders 7 through a suitable stuffing box, and is in driven engagement with a motor of any suitable construction below the cylinders 6, not shown.

Arranged substantially at right angles to the scraper arms 10 are the radially disposed aufhack arms 13, preferably of heavy steel pipe having elbows 14 rigidly connected as by welding, with the cross-head 15. The aufhack cross-head and the scraper head 9 are each capable of independent vertical adjustment along shaft 11 and of simultaneous rotation by spline engagement a with oppositely located keyways 16 in each. Head 15 depends by its central flanged extension 17 on a series of ball-bearings 18 supported on a thrust bearing raceway of the raising and lowering cross-head 19. Such construction supports the weight of the aufhack with no appreciable resistance to rotation.

The cross-head 19 and head 15 are raised and lowered by a pair of screws 20, of right and left hand threads respectively, in threaded engagement with the hubs of worm wheels 21, also of right and left hand threads. These are in driving engagement with appropriate worms 22 of the shaft 23 of a motor 24. Such power equipment is mounted on the cover frame 25 of the tub, as in Figs. 2 and 3. By such arrangement the thrust of the worms will be balanced one against the other and sufficient end play will be provided to permit the lift of the screws to equalize.

Scraper arms 10 are provided with depending bracket frames 26 to the lower terminals of which are secured inclined scrapers 27 of a form and angle arrangement to operatively engage the bottom plates 4, as in Fig. 6. These are capable of being lowered closely adjacent to the false bottom 4, for removing rotation thereover.

Scrapers 27 are so mounted on their fixed supporting arms 26 in a general radial direction from the center shaft, but are deflected forwardly slightly in the direction of their rotative travel. Their terminals 27a are further deflected, as in Fig. 1, whereby to ensure engagement with the spent grains, and collective discharge through the grains valve opening 28, as arms 10 are rotated.

The aufhack arms 13 are provided with series of sockets of seamless tubing welded to the under sides of the arms into which are fixedly inserted the ends of stirring blades 29, preferably fastened by two set screws to each. The blades 29 may be formed of extra heavy pipe, forged down at their lower ends to proper shape for stirring the mash. I show in Fig. 5 a modified construction in which the pipe stem of the blade is partially flattened, and slightly rounded bulbously at its entering edge 29a in air foil shape in cross section. A rear fin or trailing blade or edge 29b may also be provided, if desired. The blades of one set are secured to their arm at positions corresponding to one half of the spacing of the blades of the opposite set, so that in revolving in the mash they will pass in annular paths p, Fig. 1, midway between the path of the preceding set, and vice versa. Such arrangement is illustrated in the plan view, Fig. 1, and effects very complete and thorough disturbance of the mash.

By means of such construction it will be seen that the aufhack blades and the scraper blades are caused to revolve together while always maintaining the same relative relation, at intervening radial positions. Also that each set may be raised and lowered independently, or together, by the motor actuated screws 20 and plungers 7, respectively. During lautering, with arms 13 lowered, the scrapers will be in raised inoperative position.

After lautering, the aufhack will be held in raised position and the blades will extend down into the mash a short distance only and will do very little work. Upon lowering the scraper for removal of the grains, after lautering, they will be swept out through the usual grains valve. Then both the scraper and aufhack may be elevated for cleaning, removal of false bottom, etc.

The useful brew liquor or liquid extracts are drawn off from space 5 by any suitable number of gravitating conduits 30 connected with bottom 3 and discharging into the usual header tank or "grant" 31. The latter is ordinarily equipped with the usual pony masher or water mixer 32, and valves, supply conduit 31a to the brew kettle, etc. are provided for proper circulation control and supply.

We show in Fig. 7 a modified construction providing for elevation and lowering of the aufhack, consisting of a superimposed hydraulic lift. In such case a cylinder 33 is mounted by its base on the cover plate 25, and is provided with a hollow plunger 34 having a head 34a fitting within the cylinder.

The lower end of the plunger extends downwardly through the bottom of the cylinder and suitable packing 35 and is coupled, as by threaded connection, with the supporting box or housing 36, having raising and lowering connection with the aufhack cross-head 15. In such construction the cross-head is provided with an upward extension to which is secured a flange 37 resting upon a ball race 38 carried by the box 36 for free rotation therein.

Spline shaft 11 extends upwardly through the cross-head 15 and beyond, entirely through the plunger 34 and its head 34a and through a terminal cap 39 of the cylinder 33.

The cylinder is provided with a supply and exhaust connection 40, through which upon application of pressure, the plunger and cross-head will be raised. The aufhack is thus lifted to the desired extent and there held during inoperative rotation, whereupon it may be lowered to working position by release of fluid pressure. Such construction avoids the necessity of the driving motor 24 and the worm and screw gearing above described.

Sparging is effected by supplying water from the annular perforated pipe 41 as required in the usual manner.

The construction and operation will be readily understood from the foregoing description by those familiar with the art. Continuous rotation is imparted to both the aufhack and the scraper members in either operative or inoperative position, and as stated, each is capable of independent raising and lowering.

The construction as a whole is comparatively simple and the functional operative effectiveness is highly concentrated within the enclosed compass of the single lautering tank. The mechanism is comparatively simple and extremely strong and efficient, and with either of the alternative forms shown and described is capable of rapid, effective and thorough operation through either of the stages of use provided for.

The construction may be variously changed or modified in different details by the skilled mechanic to adapt it to varying sizes, conditions or other controlling factors in the installation by the skilled mechanic or designing engineer, but all such changes are to be understood as included within the scope of the following claims.

What I claim is:

1. A lautering tank provided with a rotatable double arm aufhack and a rotatable double arm scraper, each traversable annularly of the entire tank area, means for rotating them together, and means for raising and lowering each independently, the middle portion of one of said members having a clearance portion for the middle portion of the other.

2. In combination with a lautering tank and a central spline shaft, an aufhack member and a scraper member in rotatable engagement with the shaft, raising and lowering means for the aufhack member above said member, and raising and lowering means for the scraper member below said member, the middle portion of the aufhack member being upwardly recessed for clearance of the scraper member, each of said members being capable of independent raising and lowering.

3. In combination with a lautering tank and a central spline shaft, an inverted U-shape aufhack cross-head member with its upper middle portion in sliding driven engagement with the shaft and oppositely located spaced depending portions having a pair of oppositely extending arms provided with depending blades, superimposed raising and lowering means engaging the cross-head, a scraper cross-head in driven engagement with the shaft having a pair of oppositely extending arms provided with depending scrapers, and under-imposed raising and lowering means engaging the scraper cross-head.

4. In combination with a lautering tank and a central spline shaft, an inverted U-shape aufhack cross-head member with its upper middle portion in sliding driven engagement with the shaft and oppositely located spaced depending portions having a pair of oppositely extending arms provided with depending blades, superimposed raising and lowering means engaging the cross-head, a scraper cross-head in driven engagement with the shaft having a pair of oppositely extending arms provided with depending scrapers positioned radially between the aufhack arms, and under-imposed raising and lowering means engaging the scraper cross-head.

5. In combination with a central spline shaft, an aufhack member having a middle U shape clearance and an upper cross-head in driven engagement with the shaft and provided with outwardly spaced depending elbows engaging blade-supporting arms and an upper supporting flange, a surrounding housing having a raceway, and raising and lowering means connected with the housing.

6. In combination with an annular flat bottom portion and a central rotatable spline shaft, a scraper member having a middle cross-head in driven engagement with the shaft and oppositely extending arms having scraper supports, and continuously horizontal transversely inclined scraper bars secured thereto having an inner portion partly deflected from a radial position and an outer portion having an increased deflection therefrom toward the direction of rotation.

CARL L. KENNEY.